United States Patent
Mertens et al.

(10) Patent No.: US 10,728,258 B2
(45) Date of Patent: Jul. 28, 2020

(54) METHOD FOR PROVIDING AN ACCESS DEVICE FOR A PERSONAL DATA SOURCE

(71) Applicant: AUDI AG, Ingolstadt (DE)

(72) Inventors: Joris Mertens, Ingolstadt (DE); Georg Haslinger, Ingolstadt (DE); Markus Klug, Ingolstadt (DE); Edwin Ollefers, Ingolstadt (DE); Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/302,453

(22) PCT Filed: Jun. 29, 2017

(86) PCT No.: PCT/EP2017/066164
§ 371 (c)(1),
(2) Date: Nov. 16, 2018

(87) PCT Pub. No.: WO2018/010968
PCT Pub. Date: Jan. 18, 2018

(65) Prior Publication Data
US 2019/0281068 A1    Sep. 12, 2019

(30) Foreign Application Priority Data
Jul. 13, 2016    (DE) ................. 10 2016 212 819

(51) Int. Cl.
*H04L 29/06*    (2006.01)
*H04W 4/029*    (2018.01)
(Continued)

(52) U.S. Cl.
CPC ............ *H04L 63/107* (2013.01); *G06F 21/32* (2013.01); *G06K 9/00288* (2013.01);
(Continued)

(58) Field of Classification Search
CPC ...... H04L 63/107; H04W 4/029; H04W 4/80; G06K 9/00288; G06K 9/00362; G06T 7/20; G06F 3/04883; G06F 3/167
See application file for complete search history.

(56) References Cited

U.S. PATENT DOCUMENTS 8,261,090 B1    9/2012    Matsuoka
8,819,812 B1 *  8/2014    Weber ................. G06F 3/017
                                                    726/19
(Continued)

FOREIGN PATENT DOCUMENTS

CN    101496086 A    7/2009
CN    101498582 A    8/2009
(Continued)

OTHER PUBLICATIONS

Chinese Office Action dated Apr. 29, 2019 from Chinese Patent Application No. 201780024088.2, with English translation of summary of Examiner's comments, 12 pages.
(Continued)

*Primary Examiner* — Andrew J Steinle
*Assistant Examiner* — Bassam A Noaman
(74) *Attorney, Agent, or Firm* — Staas & Halsey LLP

(57) ABSTRACT

A person is automatically identified by a detection device of an observation apparatus. The identified person is shown a personalized symbol. A control action by the person causes data to be retrieved from a personal data source associated with the person and presented on a display panel. The presentation is stopped at the latest when the person leaves a sensing range of the detection device. This allows a particularly convenient and simple data use.

16 Claims, 2 Drawing Sheets

(51) Int. Cl.
| | |
|---|---|
| *G06K 9/00* | (2006.01) |
| *G06T 7/20* | (2017.01) |
| *G06F 21/32* | (2013.01) |
| *H04L 29/08* | (2006.01) |
| *H04W 4/02* | (2018.01) |
| *H04W 4/80* | (2018.01) |
| *G06F 3/0488* | (2013.01) |
| *G06F 3/16* | (2006.01) |

(52) U.S. Cl.
CPC ............ *G06K 9/00362* (2013.01); *G06T 7/20* (2013.01); *H04L 63/0861* (2013.01); *H04L 67/18* (2013.01); *H04W 4/02* (2013.01); *H04W 4/029* (2018.02); *G06F 3/04883* (2013.01); *G06F 3/167* (2013.01); *H04W 4/80* (2018.02)

(56) References Cited

U.S. PATENT DOCUMENTS

| | | |
|---|---|---|
| 2015/0019995 A1 | 1/2015 | Song et al. |
| 2015/0189070 A1 | 7/2015 | Baker |
| 2015/0256540 A1 | 9/2015 | Cheon et al. |
| 2016/0219329 A1* | 7/2016 | Jee ................... H04N 21/4367 |
| 2017/0289596 A1* | 10/2017 | Krasadakis ...... H04N 21/25883 |

FOREIGN PATENT DOCUMENTS

| | | |
|---|---|---|
| CN | 104125510 A | 10/2014 |
| CN | 104301765 A | 1/2015 |
| CN | 104811756 A | 7/2015 |
| CN | 104902332 A | 9/2015 |

OTHER PUBLICATIONS

German Office Action dated May 3, 2017 from German Patent Application No. 10 2016 212 819.1, 12 pages.
International Search Report dated Sep. 6, 2017 from International Patent Application No. PCT/EP2017/066164, 2 pages.
PCT/EP2017/066164, Jun. 29, 2017, Joris Mertens, Audi AG.
10 2016 212 819.1, Jul. 13, 2016, Joris Mertens, Audi AG.
Translation of the International Preliminary Report on Patentability dated Jan. 17, 2019 from Patent International Patent Application No. PCT/EP2017/066164, 6 pages.

\* cited by examiner

METHOD FOR PROVIDING AN ACCESS DEVICE FOR A PERSONAL DATA SOURCE

CROSS REFERENCE TO RELATED APPLICATIONS

This application is a U.S. national stage of International Application No. PCT/EP2017/066164, filed on Jun. 29, 2017. The International Application claims the priority benefit of German Application No. 10 2016 212 819.1 filed on Jul. 13, 2016. Both the International Application and the German Application are incorporated by reference herein in their entirety.

BACKGROUND

Described herein is a method for providing an access device for a personal data source of a person. Here, a personal data source of a person is a data source that contains, provides, or is able to provide personal data or information of the person and/or that belongs to the person and/or that is used or allowed to be used by the person on account of an appropriate use authorization. Naturally, in addition to personal data, the data source may additionally or alternatively also contain other data and information. By way of example, a data source can be a storage medium, a storage device or a region or portion of a storage device or of a storage medium, or else an appliance, for example an electronic appliance, with a storage medium or a storage device or the like.

These days, use of data or access to a wide variety types of data and information during daily life is often desired on a virtually permanent basis and in very different situations. Accordingly, the related art has described multifaceted use and access options for data. However, there often effectively are a multiplicity of restrictions, particular requirements and difficulties. Thus, for example, the use of certain data or access to certain data may be restricted to a specific appliance which the person would accordingly have to carry with them at all times; however, this is not always practical. If different appliances are used, difficulties often arise as a result of very different interfaces, for example user or operating interfaces, and it may be necessary for a user to memorize a multiplicity of different passwords, for example. Further difficulties that may occur include, for example, getting one's bearings when using the many different interfaces, a restricted ability to use a wireless data connection— for example in view of available bandwidth, signal quality or corresponding network development—, a restricted energy supply of a mobile terminal or else a ban on using certain electronic appliances, for example for safety reasons.

SUMMARY

Described herein is a method for providing an access device for a personal data source of a person, which facilitates particularly convenient and simple data use, and, secondly. Also described herein is a storage medium with a program code configured to carry out the method and a server device having such a storage medium.

In order to facilitate particularly convenient and simple data use, a method for providing an access device for a personal data source of a person is provided, in which, initially by an observation apparatus, a location of the person within a capture region of a recognition device is recognized independently by the recognition device and the person is identified independently by the recognition device. By way of example, the recognition device can include a camera and the person can be identified, for example, by recognition of a face, wherein provision can be made, for example, for image information captured by the camera, data or features established from these by way of an appropriate evaluation and/or further information captured by the recognition device to be compared to a corresponding database. By way of example, the further information can include a captured body size, peculiar bodily features, a speech or voice pattern or the like. Recognizing the location of a person within the capture region can also mean a simple recognition of a person since this is, of course, necessarily accompanied by the location of the person being situated within the capture region. However, a more accurate location determination or localization of the person may also be provided, particularly in the case of capture regions that can contain a plurality of possible locations or a plurality of persons.

After a successful identification of the person, a personalized symbol assigned to the person on the basis of their identity is presented in a next method operation on a display surface that is visible to the person at the location by a display device connected to the observation apparatus by way of a data link. Here, the recognition device and the display device also can be part of the observation apparatus, i.e., part of a connected appliance or connected appliance arrangement. However, for example, provision is made for both the recognition device and the display device to be connected directly or indirectly to the observation apparatus by way of respective data links. For example, the data links can be part of a network, for example an intranet or the Internet. Naturally, it is also conceivable that, for instance, only the recognition device and the display device are part of a common appliance, which is connected to the observation apparatus by way of a data link. For example, the observation apparatus can be a processor device for receiving, processing and outputting data and accordingly need not itself have any optical observation devices, such as, e.g., a camera or the like.

Provided sufficient precision and speed of the recognition device is provided, it is also possible, for example, to recognize and/or monitor or track a viewing direction and/or a posture of the person. Then, provision can be made at a respective time for the symbol to be presented in each case on a display surface that is in fact situated in a field of view or in a viewing direction of the person. Accordingly, the display surface, on which the symbol is presented, thus can also change over time or during the method. It is likewise conceivable for the symbol only to be presented on the display surface at the times or in time periods at or in which it can in fact be seen by the person, for example on account of their viewing direction or their field of view.

In a further method operation, data from the personal data source assigned to the person on the basis of their identity is retrieved and presented on the display surface following an operational action by the person if the symbol is presented i.e., while the symbol is presented on the display surface. Here, the terms symbol and data should be understood very broadly and generally. Thus, for example, the symbol can be a light pattern, optionally also a time-varying light pattern, that is detached or highlighted in respect of the respective surroundings, for example a particularly bright point or spot, a word or a character string, a geometrical or abstract form, an image, a graphic or the like. However, in principle, any other identifiable characteristics, surface properties or the like, such as, e.g., a pattern on a mechanically deformable surface, may also likewise be considered to be, and serve as, a presented symbol. The personalization of the symbol means that, in respect of at least one property, the symbol is specifically matched or adapted to the person to whom it is assigned or, for example, it can be set or be predetermined by the person themself, in accordance with their wishes. Here, provision can be made for the symbol or the design thereof or corresponding design specifications to be stored or saved in a storage device, for example of the observation apparatus. However, it is likewise possible to also save or store the symbol, the design thereof or the corresponding design specifications in the personal data source assigned to the person. For example, a retrieval of the symbol or the design or the designs specifications of the symbol from the data source is also possible before an operational action of the person. As a result, the personal symbol of the person can advantageously be presented or displayed to them, even if they have not yet undertaken any operational action for prompting a data retrieval.

As a result of the personalization of the symbol, a recognition value or a recognizability of the symbol is advantageously improved or increased, and so the person can recognize, identify and retrieve their personal symbol assigned to them as easily as possible at all times, even in unaccustomed surroundings or on unfamiliar display apparatuses or display surfaces. As a result of the unique identification of the person, an incorrect assignment between the person and the presented symbol is advantageously prevented and, moreover, a particularly high degree of data security or security of the data is obtained and ensured in respect of an unauthorized access. In this context, provision can be made, for example, for the person to be able and/or to have to decide, determine or set what data or types of data can be retrieved from the data source and/or are allowed to be presented on the display surface, for example in advance—i.e., before automatic data retrieval or an automatic data presentation. Here, there can also be, for example, different levels of corresponding authorizations and settings such that, for example, different data access authorizations can be provided or predetermined for different locations or different types of location and/or different types of display device or display surface.

The operational action, following which the data are retrieved and presented, can be, for example, a touch of a touch-sensitive surface or of such an operating element, for example a touchscreen or touchpad, an operation of an operating appliance or an operating device, such as, for instance, a keyboard, a gesture of the person, a voice command or the like. Here, for example, matching the operational action to appropriate input and/or recognition or capture devices for detecting the operational action available at the respective location may be provided and necessary. Thus, accordingly, different operational actions or types of operational action also can be provided and used at different locations.

The operational action can be, or include, a direct interaction with the symbol or the display surface on which the symbol is presented. However, it is likewise conceivable for the operational action and/or a recognition or detection of the operational action to be independent of the symbol, the presentation of the symbol and/or the display device and/or the display surface. However, actions corresponding to the operational action are only interpreted as actual operational actions if the symbol is also presented at the time of the action. By way of example, it is conceivable for the operational action also to be recognized or captured by the recognition device for the purposes of recognizing the location. In addition to the operational action for retrieving and for presenting the data, further operational actions can also be provided or possible, by which the presented data or else data to be presented can be manipulated. Thus, the presentation of the data can be implemented, for example, within the scope of an interface, a menu structure or the like and the person can manipulate the data, interact with the data, select settings and selections and more of the same by using the interface, menu structure or the like by way of the appropriate operational actions. In this sense, the presented symbol can also be considered to be an interface, a user interface or an operating interface.

After the location of the person has been recognized, the person has been identified and the personalized symbol has been presented, the display of the personalized symbol assigned to the person and the display of the retrieved and presented data on the display surface is stopped in a further method operation no later than when the person is detected leaving the capture region by the recognition device, i.e., when the person leaves the capture region. Leaving the capture region may also mean the person and/or the location of the person can no longer be or are no longer recognized or determined by the recognition device. Expressed differently, provision can be made for the presentation of the symbol and/or of the data to be stopped even in the case of a failed attempt of recognizing the location of the person and/or the person. Furthermore, it is conceivable for the presentation of the data and/or of the symbol to be stopped by way of an appropriate operational action or setting by the person, for example even before the capture region has been left. The person can therefore mask the presented data and/or the symbol at any time by way of an appropriate operational action. Likewise, it is conceivable for the data to be presented or superimposed only for a respective restricted predetermined period of time in all cases—or only if the person has set a corresponding setting.

Overall, a multiplicity of different advantages arise from the method. Thus, the presentation of the symbol, the data and/or an interface can be device independent, and so particularly simple, fast and secure operability and data use is facilitated without the person having to get used to a multiplicity of different presentations or interfaces. By way of example, this can avoid incorrect operations and increase efficiency when using the data or receiving information. Moreover, a respective registration, authentication or login at each device or at each operating and/or display device by the person can advantageously be dispensed with, which can lead or contribute to time being saved and security being increased. Furthermore, it is advantageous that access to the personal data source of the person is also facilitated when the person, for example, is not carrying along with them a mobile terminal used to this end or the latter is not operational or cannot be used. A further advantage may be that the display surface used to present the data can be significantly larger than, for example, a display surface of a mobile terminal carried along by the person, and so more data are simultaneously displayable and/or the presented data are recognizable in a better and easier manner.

In a further configuration, provision is made for the display device and/or the display surface for displaying the symbol to be selected depending on the identified location of the person. By way of example, a plurality of display devices and/or display surfaces, referred to together as display options, may thus be available at the location and/or in the surroundings of the location, the one best suited to presenting the symbol in each case then being used. By way of example, the best-suited display option can be the one with the smallest distance from the person, which can be seen best by the person—in respect of a viewing angle, for example—or which can be reached or operated best by the person. Likewise, e.g., the recognition device and/or the observation apparatus can be connected directly or indirectly to a plurality of display options, wherein these may also be situated at locations that are spatially separated from one another. The selection of the display option depending on the location or on a change in location of the person in this case does not mean minimal movements of the person, such as changes in a body position or posture, for example. Rather, the selection or an adaptation of the selected display option is implemented, for example, when the person moves or changes location within a building, for example between different rooms in the building, when the person moves or changes location within a town, for example between different buildings or addresses in the town, or when the person moves or changes location at the level of a geographic region or country, or else on an international level. Thus, there may be a type of roaming in this respect, in which the person can also move, for example, through a plurality or multiplicity of capture regions of different recognition devices and/or the person moves in such a way that a display surface, which is visible to the person at one time is no longer visible at a later time from the then current location of the person. However, for example, there can also be provision or implementation of a selection of a display option from a plurality of available display options or display regions within a vehicle or transportation vehicle, for example an aircraft, a track vehicle, a bus, a watercraft or the like. Thus, this advantageously ensures that the person has access to their personal or personalized symbol and, accordingly, to at least their personal data source, even in the case of very different types of movement and movement profiles.

In a further configuration, provision is made for the presented data to be selected depending on a spatial and/or temporal and/or thematic context of the location and/or of the person. Expressed differently, the presented data, a corresponding interface, for example a personalized interface, a menu structure or the like thus can be context-dependent or context-based or can be adapted. This can advantageously ensure that, in a multiplicity of possible situations, the respectively most relevant data are particularly easily visible or accessible. As a result of the context-dependent selection of the presented data, it is thus possible to optimize the efficiency when using the data and/or interface, to simplify an operation and consequently to improve operational comfort. By way of example, a selection of the presented data depending on a spatial context can mean a presentation of a flight plan or an overview of departure times at an airport, a presentation of a room occupancy or a program plan at an event location, a presentation of tourist information in the surroundings of an attraction or the like. Naturally, a short list-like link to such information, for example, may also be provided or presented here, for example in place of this information itself. For a temporal context, it is possible, for example, to take account of a diary of the person, a time of day or a time of year or a date—a local holiday, for example—or, for instance, opening times of very different establishments at the location or in the surroundings of the location of the person. For a thematic context, it is possible to take account of, for example, a theme or motto of a theme-related event, an occupation or a sector, in which the person is occupied, or the like. However, it is likewise also conceivable for the presented data and/or a type of presentation of the data to be selected depending on, or taking account of, an available or used display option. Thus, for example, dimensions of the display surface, a distance between the display surface and the person and/or the respectively available operational or interaction options may be taken into account.

In a further configuration, provision is made for identification of the person and/or recognition of the location to be assisted by data transfer from a mobile terminal of the person. By way of example, such a mobile terminal can be a cellular telephone (smartphone), a portable computer, a tablet computer, an appropriately equipped electronic wristwatch (smartwatch) or the like. Here, for example, the mobile terminal can transmit a signal which facilitates or assists with identification and/or authentication. By way of example, such a signal may include personal information of the person and/or an individual identification feature of the person and/or of the appliance, such as, for example, a GUID (Globally Unique Identifier) or UUID (Universally Unique Identifier) number or a security certificate. Advantageously, security or reliability when identifying the person can be improved by such assistance. It is also conceivable that such an assistance and/or a further form of identification or authentication is necessary for access to certain personal and/or particularly security-relevant data.

Accordingly, provision is explicitly made in a further configuration for some or all of the data only to be presented after an authentication of the person. As a result of this, it is advantageously possible to prevent unauthorized persons from gaining access to these data or further persons situated in the surroundings of the person—in a public space, for example—from inadvertently viewing these data if the employed display surface is, or can be, also seen by these further persons.

In a further configuration, provision is made for the respective location of a plurality of persons simultaneously situated within the capture region to be recognized, for the persons to be identified and for each of the persons to be respectively presented with a dedicated personalized symbol that is assigned according to their respective identity. Accordingly, each person can also obtain or be granted access to their respective personal data source independently of one another and also at the same time via the personal and/or personalized symbol assigned to them. This advantageously facilitates a particularly flexible application of the method that is usable in many different situations and surroundings. It is also conceivable for the persons to be in a plurality of capture regions. Firstly, this can mean that, at the location of one, several or all persons, the respective capture regions of different recognition devices overlap or superimpose. However, it can also mean that different persons are situated in different capture regions, for example capture regions separated from one another, of one or more recognition devices. In this case or in these cases, too, there can be a simultaneous identification and symbol assignment, particularly when the various recognition devices are connected to the same observation apparatus. Here, simultaneous should be understood to mean on a timescale of human perception and not, for instance, on a timescale of individual microscopic switching processes, for example in a processor device.

In a further configuration, provision is made for the data to be retrieved from a storage device of an online server device and/or from a mobile terminal of the identified person. Here, for example, the option offering the greatest bandwidth or transfer speed in the respective situation can be chosen in each case for the retrieval of the data. Advantageously, this facilitates a particularly flexible use of different storage devices or data locations and an optimum operating and use convenience. Furthermore advantageously, this can also increase data security by virtue of, for example, all data of the person not needing to be stored in a single storage device and/or all data not needing to be accessible, reachable or retrievable by way of the Internet, for example. By way of example, it is conceivable that data are retrieved from the mobile terminal by way of a near field communication (NFC) interface, by way of a Bluetooth connection or similar local data link, without the mobile terminal, the recognition device, the display device and/or the observation apparatus necessarily being connected to the Internet and/or transmitting the data retrieved from the mobile terminal via the Internet. Conversely, the option of recalling the data from the online server or storage device advantageously offers an option of using the data and the method independently of a specific terminal or of carrying along of a specific terminal and, moreover, can provide security in relation to a loss of the mobile terminal, for example.

In a further configuration, provision is made for the data to be retrieved from a storage device of an online server device and/or from a mobile terminal of the identified person. Here, for example, the option offering the greatest bandwidth or transfer speed in the respective situation can be chosen in each case for the retrieval of the data. Advantageously, this facilitates a particularly flexible use of different storage devices or data locations and an optimum operating and use convenience. Furthermore advantageously, this can also increase data security by virtue of, for example, all data of the person not needing to be stored in a single storage device and/or all data not needing to be accessible, reachable or retrievable by way of the Internet, for example. By way of example, it is conceivable that data are retrieved from the mobile terminal by way of a near field communication (NFC) interface, by way of a BLUETOOTH connection or similar local data link, without the mobile terminal, the recognition device, the display device and/or the observation apparatus necessarily being connected to the Internet and/or transmitting the data retrieved from the mobile terminal via the Internet. Conversely, the option of recalling the data from the online server or storage device advantageously offers an option of using the data and the method independently of a specific terminal or of carrying along of a specific terminal and, moreover, can provide security in relation to a loss of the mobile terminal, for example.

Moreover, the disclosure relates to, and includes, a server device including such a storage medium.

Independently of any other further configuration, provision can also be made for information to be retrieved and presented from a data source that is not specifically assigned to the identified person, in addition to the data retrieved from the personal data source. By way of example, this can be information that should be displayed at the respective location of each person, independently of their identity. By way of example, this additional information can be retrieved from a storage device of a third party, a company, a public body or the like. By way of example, this can be general information—for instance, in a temporal and/or thematic context of the respective location—or else general announcements or communications. In this form, the method can be used similar to a dissemination or transmission of a broadcasting communication, for example in order to communicate or make accessible particularly current information to a multiplicity of persons. It is likewise conceivable for the additional information to include or represent advertisement, for example.

To the extent that this is advantageously possible, the functional embodiments of the method described herein, of the storage medium according described herein and of the server device described herein, as described previously and below and in the claims, and the corresponding advantages are in each case reciprocally transferable in a correspondingly analogous manner between the method, the storage medium and the server device and devices and components used for implementing or carrying out the method.

BRIEF DESCRIPTION OF THE DRAWINGS

These and other aspects and advantages, features and details will become more apparent and more readily appreciated from the following description of example embodiments, taken in conjunction with the accompanying drawings, of which.

DETAILED DESCRIPTION

Figure 1:
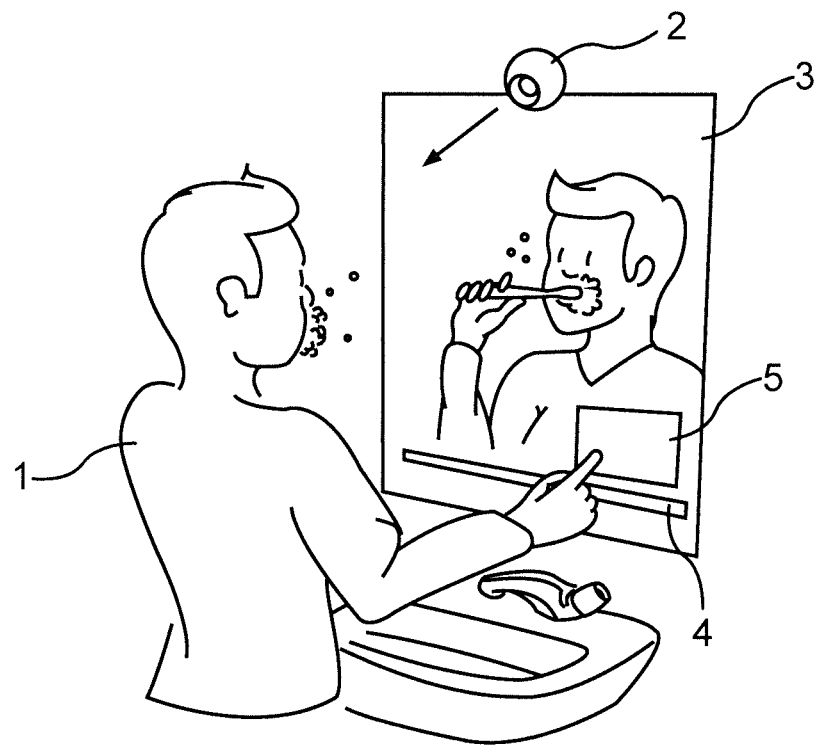
FIG. 1 is a schematically and perspectively illustrated situation, in which data are presented to a person in private surroundings.

Reference will now be made in detail to example embodiments which are illustrated in the accompanying drawings, wherein like reference numerals refer to like elements throughout.

FIG. 1 shows a schematically and perspectively illustrated situation, in which a person 1 is in private surroundings, for example in a bathroom. Here, the person 1, for example the face of the person 1, is situated in a capture region of a recognition device which, in the present case, includes a camera 2. The camera 2 can include a computer or processor device, by which facial recognition can be carried out on the basis of image data recorded by the camera 2 and by which the person 1 can thus be identified. Moreover, the camera 2 is directly or indirectly connected to an observation apparatus (not illustrated here), to which the recognized identity of the person 1 is transmitted. Alternatively, it is also conceivable for the image data captured by the camera 2 or for a selection or a portion of these image data, which is particularly suitable for identifying the person 1, to be transmitted to the observation apparatus, which then undertakes appropriate evaluating and/or processing of these transmitted image data for the purposes of identifying the person 1.

The observation apparatus is also directly or indirectly connected to a display device via a data link, the display device in the present case including a mirror 3 or at least a portion of the mirror 3 as a display surface. By way of example, a screen, for example a screen embodied in touch-sensitive fashion, i.e., as a touchscreen, can be provided or arranged in or at the mirror 3, at least in portions thereof. Consequently, a symbol presentation region 4 can be displayed or presented on the mirror 3, for example in a manner controlled by the observation apparatus. In the present case, a light or luminous band, i.e., a narrow luminous region with a long extent, is provided as symbol presentation region 4. By way of example, a section or portion of the symbol presentation region 4 can shine particularly brightly or with a specific pattern as a symbol and, as a result thereof, it can be highlighted in relation to the remaining symbol presentation region 4 and also in relation to the remaining surface of the mirror 3. The symbol displayed thus is assigned, for example, to the person 1 in individual and personal fashion, depending on their recognized identity. A data presentation 5 is displayed—likewise on the mirror 3—following an operational action of the person 1. By way of example, the operational action can be touching the symbol, a predetermined defined gesture, a voice command or the like.

Here, the data presentation 5 can include, for example, a personalized and context-dependent menu structure and/or a corresponding interface. Hence, further interaction with the data presentation 5 is facilitated for the person 1. By way of example, the person can navigate through the menu structure, have certain other data displayed to them, adjust settings or more of the same. The symbol presentation region 4 can be displayed on a permanent basis, for example, as a result of which it is already possible to signal to the person 1 from a relatively large distance and for the person consequently already to be able to identify from outside the capture region of the camera 2 that a display surface for their data or an interaction opportunity with their data is provided here. It may also be conceivable to adapt the type, the form, the color or any other property of the symbol presentation region 4 and/or the data presentation 5 depending, in each case, on specifically available operating or interaction opportunities. By way of example, a different color may be provided if the mirror 3 is embodied only as a display screen but not as a touchscreen. However, it is also conceivable for the symbol presentation region 4 and the symbol itself only to be automatically presented once the person 1 moves into the capture region of the camera 2 and/or approaches the mirror 3 up to a predetermined distance. Here, this distance, too, can be predetermined depending on, for example, the size of the mirror 3 or the size of the display surface or on the available display and operating opportunities and/or it can be adapted by the person.

By way of example, input of a password can therefore be dispensed with as a result of the automatic recognition and identification of the person 1. However, in order to increase the security, provision can also be made here of an additional query of, e.g., a password or pin code in order to obtain access to the data presentation 5 or certain parts thereof. Particularly advantageously, the password in this case can be independent of the respectively specifically used recognition device and display device. For example, the observation apparatus can include an online server and/or processor device. Accordingly, this renders it possible to be able to display to the person their personal symbol and their personal data presentation 5 at their respective location, even when the location changes. For example, this can also ensure that the personal data presentation 5 of the person 1 is only presented at a single location at any one time, as a result of which the security, for example in relation to unauthorized use, can be additionally increased.

Figure 2:
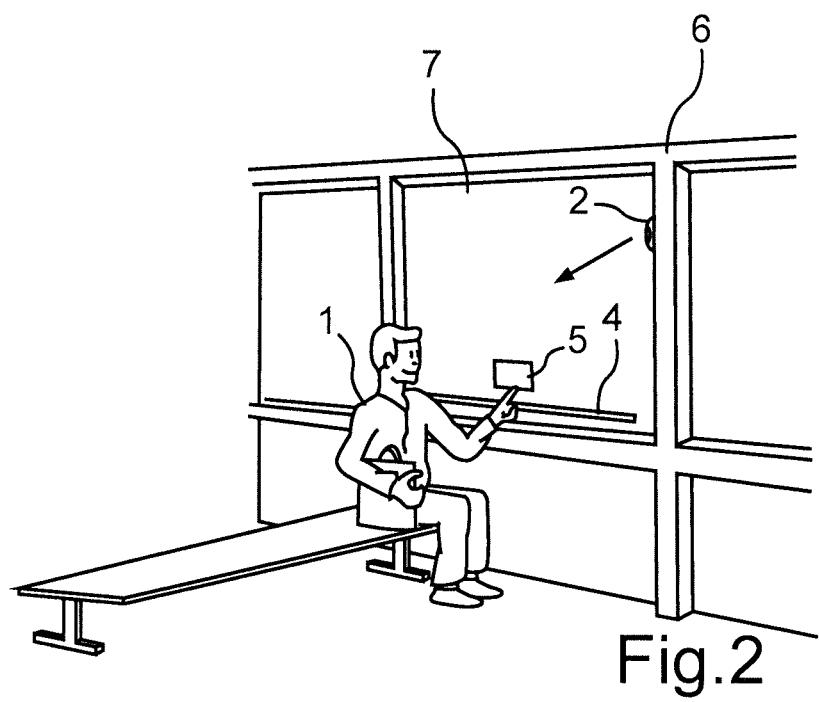
FIG. 2 is a further schematically and perspectively illustrated situation, in which data are presented to the person in public surroundings.

During the scope of normal daily routine, the person 1 can move away from the situation illustrated in FIG. 1 and the person can visit, for example, a building 6 that is illustrated schematically, perspectively and sectionally in FIG. 2. By way of example, the building 6 can be a public building such as, for instance, an airport, a station, a public administration center or the like. Here, a window pane 7 of the building 6 can serve as a display surface, on which the symbol presentation region 4 and the data presentation 5 can be displayed. Here too, a camera 2 can be provided as recognition device, the capture region of the camera being able to be aligned in such a way that it is possible to recognize and identify persons situated in a region near the window pane 7. By way of example, a near region can be considered to be a region within which the data presentation 5 can be reliably seen or identified by the person 1 and/or within which an operation of, or interaction of or with, the data presentation 5 by the person 1 is possible. In a further example, the building 6 can also be a hotel, with then, within the scope of a context-based selection of the presented data, e.g., tourist information, trip information or the like being displayed or being able to be contained or linked in the data presentation 5.

Since in the building 6, too, there is an automatic recognition and identification of the person 1 and an automatic presentation of the symbol presentation region 4 and, optionally, the personal data presentation 5, what therefore emerges from the view of the person 1 is that the symbol and hence the opportunity to access their personal data follows them. Since data retrieved from a personal data source assigned to the person 1 on account of, or on the basis of, their identity are presented in the data presentation 5, it is particularly important for the presentation of these data to be stopped no later than when the person 1 moves away from the capture region of the camera 2. Accordingly, no further persons then have access to the personal data of the person 1, even in a public space. This also applies if a further person uses the same window pane 7 for displaying data as person 1 did previously. Thus, a subsequent person has no option of retrieving or having displayed to them anew data previously presented to the person 1 which were retrieved from the personal data source of the person 1.

Furthermore, particularly in public spaces, it is still particularly important in this case for, at the same time, a plurality of persons to be able to interact with their personal data or, depending on the respectively provided possibilities, to have at least their data displayed to them. Accordingly, there is an automatic recognition and identification of even a plurality of persons at the same time, wherein then each person is, or can be, assigned and displayed their dedicated symbol and their dedicated data presentation 5 on an individual basis.

Figure 3:
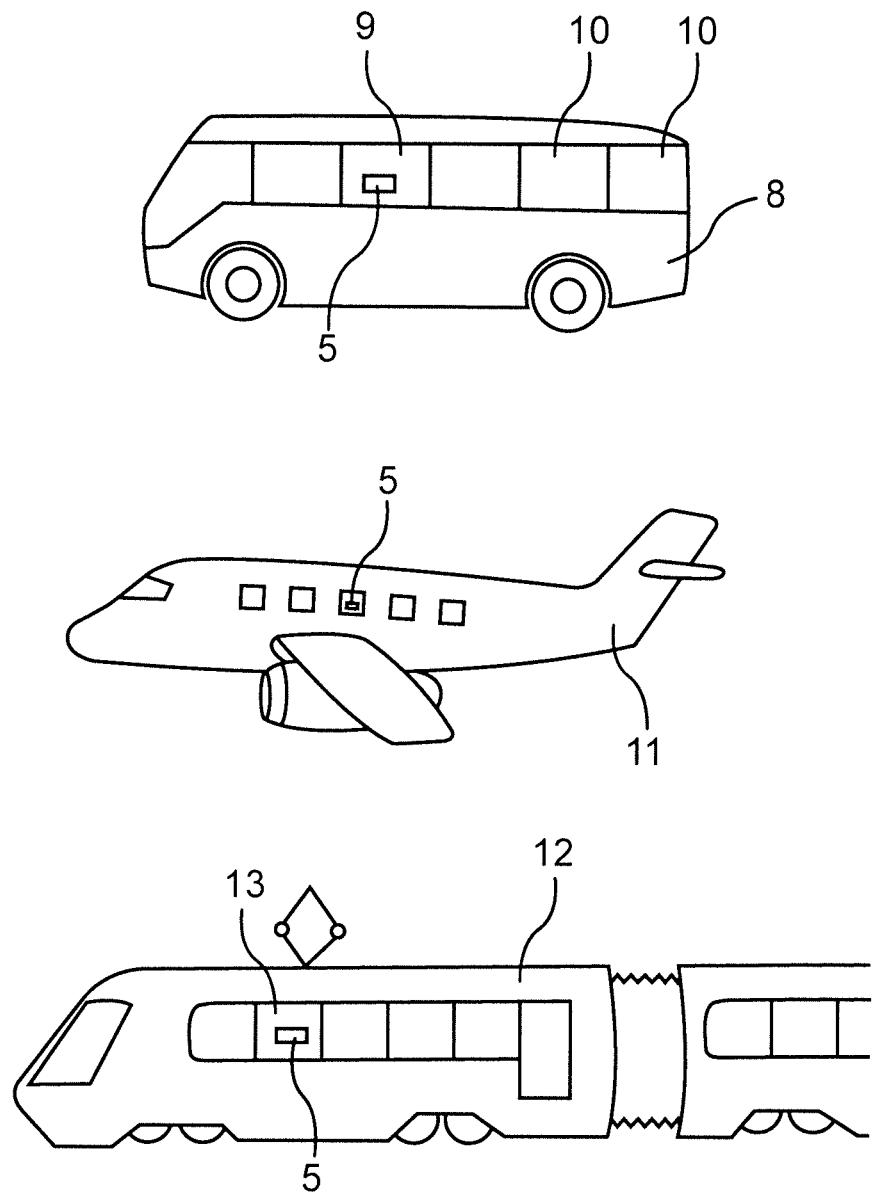
FIG. 3 is a schematic exemplary data presentation at or in different vehicles.

FIG. 3 shows schematic side views of a plurality of different vehicles in an exemplary fashion, the data presentation 5 likewise being able to be displayed in the vehicles. A bus 8 is presented as a first of the vehicles; here, the data presentation can be displayed in a window pane 9, for example. For example, the remaining window panes 10 of the bus 8 are also configured for presenting the data presentation 5 in this case, and so a location-accurate or position-accurate display of the data presentation 5 is possible when the person 1 visits a different seat within the bus 8, for example. An aircraft 11 is presented as a second of the vehicles; here, the data presentation 5 can likewise be displayed in a side window in analogous fashion. A train 12 is presented as a third of the vehicles and, here too, the data presentation 5 can be presented in a side window or a window pane 13, for example. Naturally, in the case of both the vehicles 8, 11, 12 and buildings 6, other surfaces or components or devices to the respective window panes 7, 9, 10, 13 can also serve, additionally or alternatively, as display surfaces for presenting the symbol presentation region 4, the symbol and/or the data presentation 5. In principle, a corresponding presentation is conceivable on any suitable surface.

A description has been provided with particular reference to example embodiments, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for providing an access device for a personal data source assigned to a person, the method comprising:
   recognizing, independently by a recognition device, a location of the person within a capture region of the recognition device;
   identifying, independently by the recognition device, the person, using at least one of a camera, a microphone, or data transferred from a mobile terminal of the person, the data including at least one of a Globally Unique Identifier, a Universally Unique Identifier number, or a security certificate;
   permanently assigning a personalized symbol to the person such that, when the person changes location, a current location of the person is tracked by an observation apparatus using the personalized symbol, the observation apparatus including an online server device connected to a plurality of display devices via respective data links;
   selecting a display device among the plurality of display devices for displaying the personalized symbol based on the current location of the person;
   displaying, on a display surface of the display device visible to the person at the current location, the personalized symbol assigned to the person based on the identity of the person;
   when authentication is not required, retrieving first data from the personal data source assigned to the person based on the identity of the person and displaying the retrieved first data on the display surface following an operational action by the person when the personalized symbol is displayed, the observation apparatus ensuring that the retrieved first data is only displayed at a single location at any one time;
   when the first data is retrieved and displayed, terminating the displaying of the personalized symbol assigned to the person and the displaying of the retrieved first data on the display surface no later than when the person is detected leaving the capture region by the recognition device,
   when authentication is required and successfully performed, retrieving second data from the personal data source assigned to the person based on the identity of the person and displaying the retrieved second data on the display surface following the operational action by the person when the personalized symbol is displayed, the observation apparatus ensuring that the retrieved second data is only displayed at the single location at any one time; and
   when the second data is retrieved and displayed, terminating the displaying of the personalized symbol assigned to the person and the displaying of the retrieved second data on the display surface no later than when the person is detected leaving the capture region by the recognition device,
   wherein
   authentication, when required, is to be performed after the person is identified,
   authentication is preset by the person as being required according to at least one of a location of the display surface and a type of the display surface, and
   the first data is data preset as being displayable without requiring authentication, and the second data is data preset as requiring successful authentication before displaying the second data.

2. The method as claimed in claim 1, wherein retrieving the first data or second data from the personal data source is based on at least one of a spatial, temporal, or thematic context of the location and/or of the person.

3. The method as claimed in claim 1, wherein recognizing the location is assisted by data transfer from the mobile terminal of the person.

4. The method as claimed in claim 1, wherein
   recognizing the location of the person includes recognizing, independently by a corresponding recognition device, a respective location of a plurality of persons simultaneously situated within a respective capture region of the corresponding recognition device,
   identifying the person includes identifying, independently by the corresponding recognition device, each of the persons, and
   displaying the personalized symbol includes displaying, on a display surface of a respective display device visible to the person at the respective location, a respective personalized symbol assigned to the person at the respective location according to the identity of the person at the respective location.

5. The method as claimed in claim 1, wherein retrieving the first data or second data includes retrieving the first data or second data from a storage device of the online server device and/or from the mobile terminal of the person.

6. A non-transitory computer readable storage medium with a program code configured to, when executed by a processor device of an electronic appliance, carry out a method comprising:
   recognizing, independently by a recognition device, a location of a person within a capture region of the recognition device,
   identifying, independently by the recognition device, the person, using at least one of a camera, a microphone, or data transferred from a mobile terminal of the person, the data including at least one of a Globally Unique Identifier, a Universally Unique Identifier number, or a security certificate,
   permanently assigning a personalized symbol to the person such that, when the person changes location, a current location of the person is tracked by an observation apparatus using the personalized symbol, the observation apparatus including an online server device connected to a plurality of display devices via respective data links,
   selecting a display device among the plurality of display devices for displaying the personalized symbol based on the current location of the person,
   displaying, on a display surface of the display device visible to the person at the current location, the personalized symbol assigned to the person based on the identity of the person,
   when authentication is not required, retrieving first data from a personal data source assigned to the person based on the identity of the person and displaying the retrieved first data on the display surface following an operational action by the person when the personalized symbol is displayed, the observation apparatus ensuring that the retrieved first data is only displayed at a single location at any one time,
   when the first data is retrieved and displayed, terminating the displaying of the personalized symbol assigned to the person and the displaying of the retrieved first data on the display surface no later than when the person is detected leaving the capture region by the recognition device, when authentication is required and successfully performed, retrieving second data from the personal data source assigned to the person based on the identity of the person and displaying the retrieved second data on the display surface following the operational action by the person when the personalized symbol is displayed, the observation apparatus ensuring that the retrieved second data is only displayed at the single location at any one time, and when the second data is retrieved and displayed, terminating the displaying of the personalized symbol assigned to the person and the displaying of the retrieved second data on the display surface no later than when the person is detected leaving the capture region by the recognition device, wherein authentication, when required, is to be performed after the person is identified, authentication is preset by the person as being required according to at least one of a location of the display surface and a type of the display surface, and the first data is data preset as being displayable without requiring authentication, and the second data is data preset as requiring successful authentication before displaying the second data.

7. The non-transitory computer readable storage medium as claimed in claim 6, wherein the recognition device includes the camera to capture an image of the person, the display device includes a touchscreen, and the recognition device and the display device are remotely disposed from the observation apparatus and connected to the online server device via respective data links.

8. The non-transitory computer readable storage medium as claimed in claim 6, wherein the operational action includes at least one of touch input to a touch-sensitive surface of the display surface of the display device, an input to a keyboard, a gesture, or a voice command.

9. The non-transitory computer readable storage medium as claimed in claim 8, wherein the operational action is only recognized when the personalized symbol is displayed when the operational action is performed.

10. The non-transitory computer readable storage medium as claimed in claim 6, wherein the personalized symbol is displayed only when the personalized symbol is in a field of view and view direction of the person, and the personalized symbol includes a light pattern specific to the person.

11. An online server device, comprising:

at least one memory; and at least one processor configured to execute one or more programs or instructions stored in the at least one memory to:

recognize, independently by a recognition device, a location of a person within a capture region of the recognition device, identify, independently by the recognition device, the person, using at least one of a camera, a microphone, or data transferred from a mobile terminal of the person, the data including at least one of a Globally Unique Identifier, a Universally Unique Identifier number, or a security certificate, permanently assign a personalized symbol to the person such that, when the person changes location, a current location of the person is tracked by the online service device using the personalized symbol, the online server device being connected to a plurality of display devices via respective data links, select a display device among the plurality of display devices for displaying the personalized symbol based on the current location of the person, display, on a display surface of the display device visible to the person at the current location, the personalized symbol assigned to the person based on the identity of the person, when authentication is not required, retrieve first data from a personal data source assigned to the person based on the identity of the person and display the retrieved first data on the display surface following an operational action by the person when the personalized symbol is displayed, the online server device ensuring that the retrieved first data is only displayed at a single location at any one time, when the first data is retrieved and displayed, terminate the displaying of the personalized symbol assigned to the person and the displaying of the retrieved first data on the display surface no later than when the person is detected leaving the capture region by the recognition device, when authentication is required and successfully performed, retrieve second data from the personal data source assigned to the person based on the identity of the person and displaying the retrieved second data on the display surface following the operational action by the person when the personalized symbol is displayed, the observation apparatus ensuring that the retrieved second data is only displayed at the single location at any one time, and when the second data is retrieved and displayed, terminate the displaying of the personalized symbol assigned to the person and the displaying of the retrieved second data on the display surface no later than when the person is detected leaving the capture region by the recognition device, wherein authentication, when required, is to be performed after the person is identified, authentication is preset by the person as being required according to at least one of a location of the display surface and a type of the display surface, and the first data is data preset as being displayable without requiring authentication, and the second data is data preset as requiring successful authentication before displaying the second data.

12. The online server device as claimed in claim 11, wherein the first data or second data is retrieved from the memory and/or from the mobile terminal of the person.

13. The online server device as claimed in claim 12, wherein the first data or second data is retrieved from the mobile terminal of the person via at least one of a near field communication interface or a BLUETOOTH connection.

14. The online server device as claimed in claim 11, wherein the online server device includes the recognition device and the display device.

15. The method as claimed in claim 1, wherein the personalized symbol is stored in a storage device of the observation apparatus, and the personalized symbol is retrieved from the storage device of the observation apparatus and displayed on the display surface of the display device when the person is identified by the recognition device and before the operational action by the person.

16. The method as claimed in claim 1, wherein the displaying, on the display surface of the display device visible to the person at the current location, the personalized symbol assigned to the person based on the identity of the person, occurs only when the personalized symbol is in a field of view and viewing direction of the person.

* * * * *